Sept. 22, 1931. D. A. SILLERS ET AL 1,824,305
RECORDING GRAVITOMETER FOR GASES
Filed April 27, 1929 4 Sheets-Sheet 1

*Fig.1.*

Inventors
D. A. Sillers
H. W. Price
AND J. W. Bartlett

By Rob't E. Barry
Attorney

Sept. 22, 1931.    D. A. SILLERS ET AL    1,824,305
RECORDING GRAVITOMETER FOR GASES
Filed April 27, 1929    4 Sheets-Sheet 4

Inventors
D. A. Sillers
H. W. Price
AND J. W. Bartlett
By Robt. E. Barry
Attorney Patented Sept. 22, 1931

1,824,305

UNITED STATES PATENT OFFICE

DONALD A. SILLERS, OF DALLAS, HOWARD W. PRICE, OF BRECKENRIDGE, AND JOSEPH W. BARTLETT, OF HOUSTON, TEXAS, ASSIGNORS TO REFINERY SUPPLY COMPANY, OF TULSA, OKLAHOMA

RECORDING GRAVITOMETER FOR GASES

Application filed April 27, 1929. Serial No. 358,534.

During recent years the necessity of continuous record of the gravity of gas for measurement purposes has become more evident to the gas industry, and while in the past periodic gravity tests at intervals sufficed for making the necessary correction due to varying gravity, the gas industry has increased to such proportions and the constituents of the gas bought and sold so widely it has become necessary to use a more definite and accurate means of correcting for the varying gravity. Gravity is one of the most important variables to consider in the measurement of gas by an orifice meter and frequently is the cause of more errors in gas measurement than any other one factor.

The present invention has for its object to provide a gas balance or gravitometer for accurately and continuously recording the density of gases wherein the buoyant effect of gas in air is utilized to actuate the recording mechanism, the gas being caused to continuously pass through and completely fill a chamber accurately balanced and hermetically closed at its upper and lower ends by liquid seals, the liquid seals in balancing, permitting the chamber to vary in vertical position dependent on the density of the gas passing therethrough.

A further object is the provision of an instrument of the character described capable of accurately compensating automatically for varying atmospheric conditions such, for instance, as temperature and barometrical pressure.

A further object of the invention is the provision of a compensating device for the purpose above stated wherein a correction for varying atmospheric conditions is effected by means of automatically effected variations in weight of the balance arm, suspending the buoyant chamber through which the gas is passed.

A further object is the provision of an instrument of the character stated which may be readily calibrated by means of weights.

A further object of the invention is the provision of a gravitometer which is of rugged simple and reliable construction capable of convenient assembly and of such compact form as to occupy only a minimum of space.

A still further object is the provision of a gravitometer in which the time lag in recording variations of density is reduced to a minimum, and further in which the volume of gas necessary for obtaining a record is small.

In the accompanying drawings wherein an approved embodiment of the invention is illustrated Fig. 1 is a perspective view of the complete apparatus, certain of the walls of the casing being removed and the door of the chamber of the recording mechanism being disposed in open position;

Figure 2:
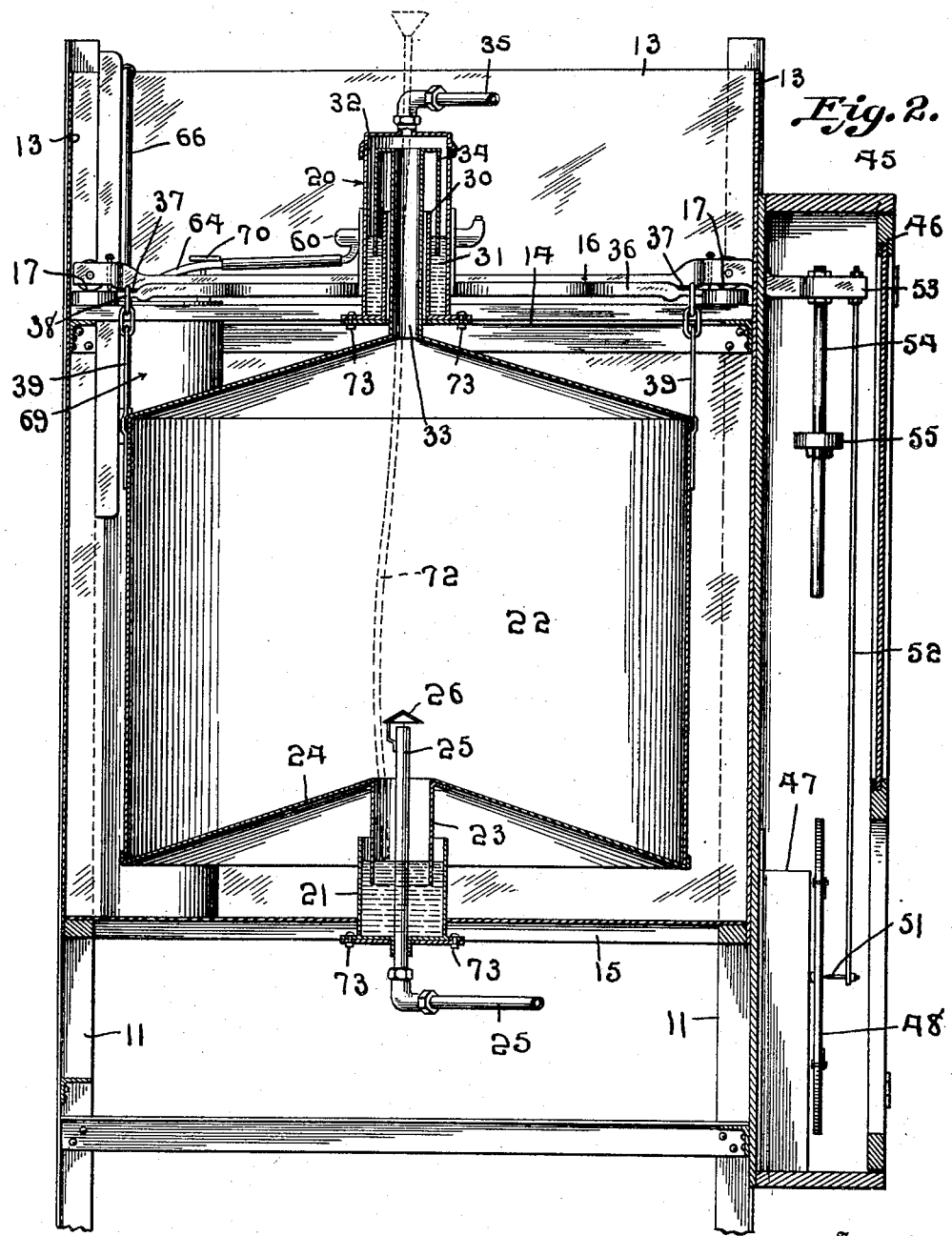
Fig. 2 is a vertical sectional view taken in the direction of the pivotal axis of the balance bar on the line 2—2 of Fig. 3.
Figure 3:
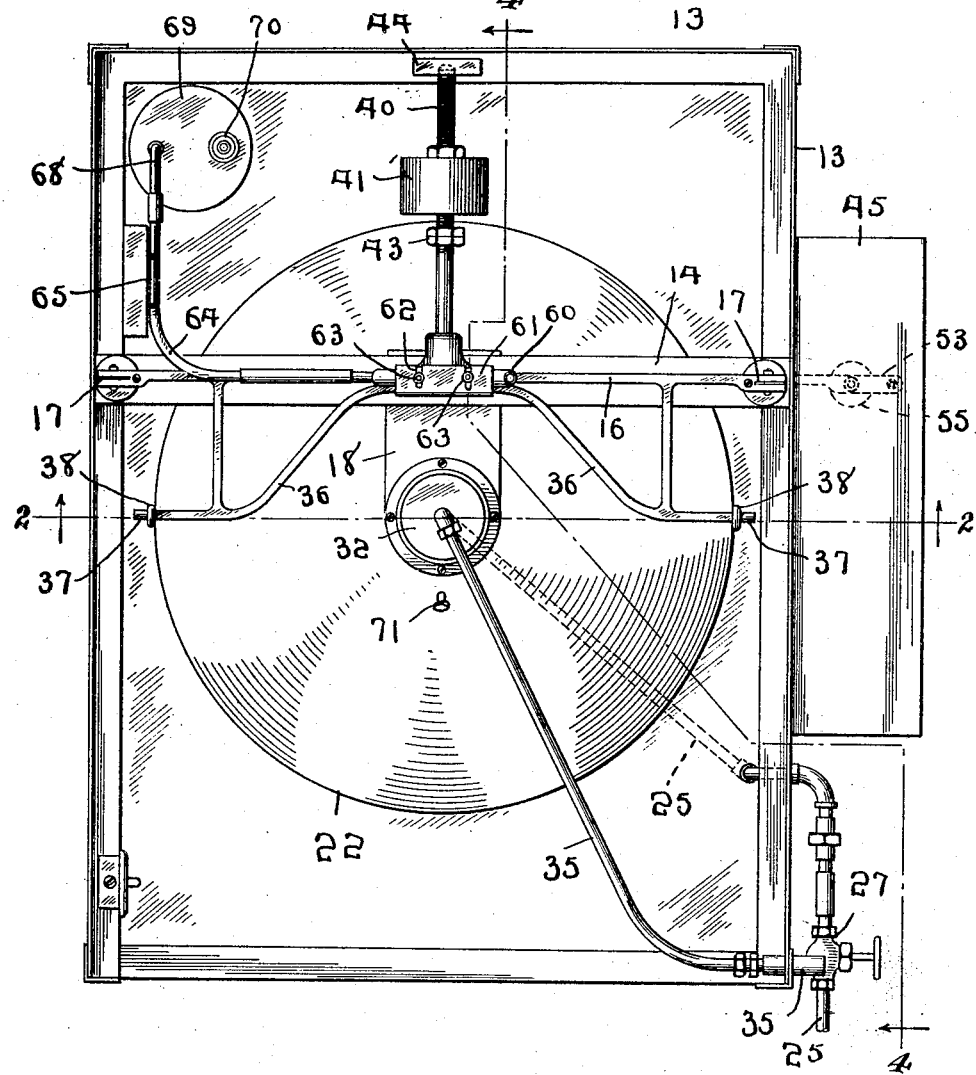
Fig. 3 is a plan view of the apparatus.
Figure 4:
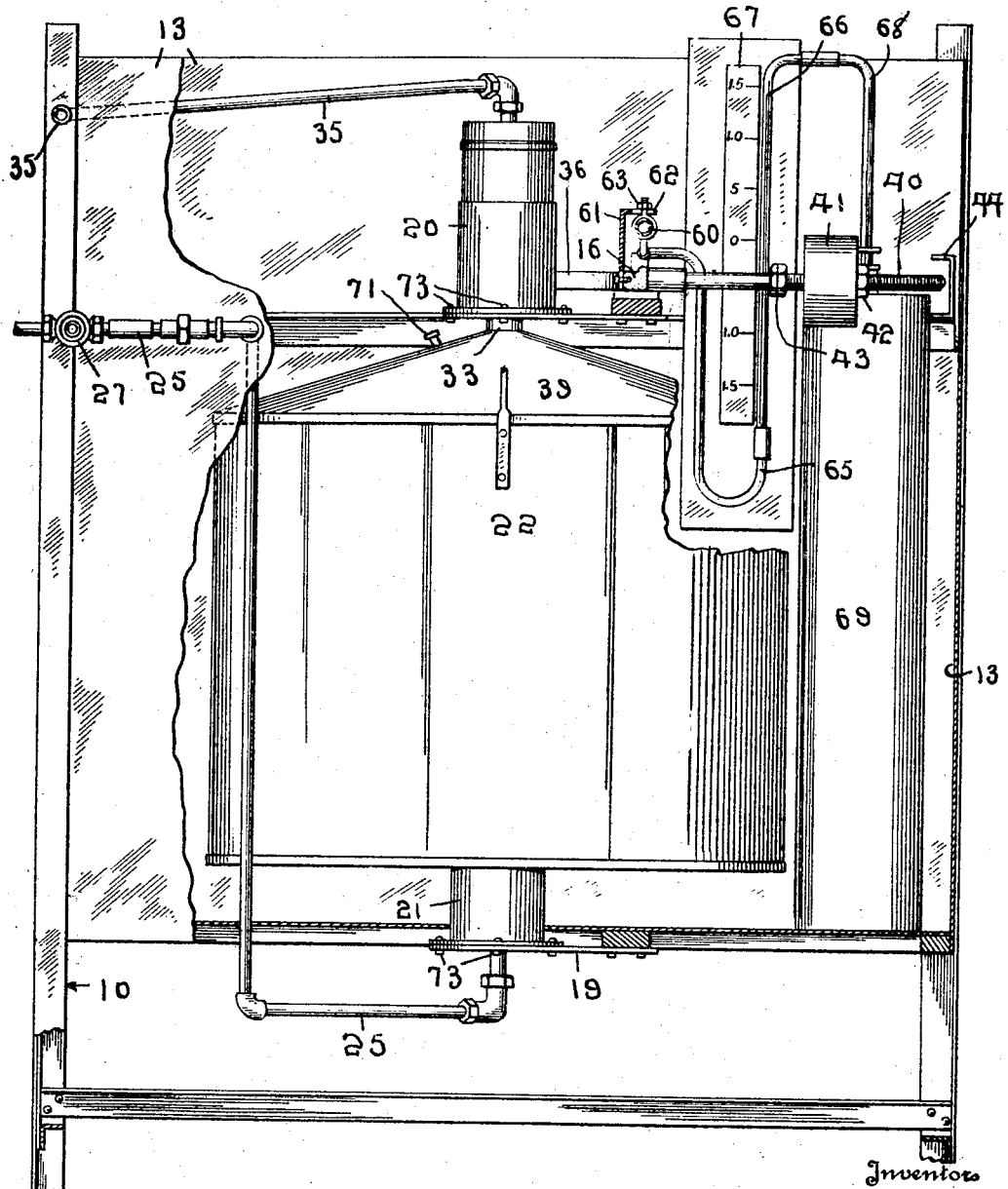
Fig. 4 is a partial side elevation in section, the plane of the section being indicated by the line 4—4 of Fig. 3.

Referring to the drawing in detail, the numeral 10 indicates a supporting frame structure supported in an elevated position upon legs 11 carrying leveling screws 12 at the lower ends thereof in order that the length of the supporting legs may be varied in accordance with the variations in the level of the foundation upon which the apparatus is set. The upper portion of the frame 10 is closed by top, bottom and side walls 13 to provide a closed compartment for the reception and protection of the balance mechanism of the gravitometer. The side members of the frame 10 are connected by upper and lower supporting bars 14 and 15 for the balance bar 16 which is mounted at both ends for tilting movement on knife edges 17. The bars 14 and 15 also support brackets 18 and 19 to which are secured the fluid containing cups 20 and 21 for the upper outlet and lower inlet ends of the gas container or float 22.

The lower cup 21 is filled with a suitable sealing fluid to a desired height and receives the lower tubular extension 23 provided on the substantially conical bottom 24 of the float 22, the body of the latter being of substantially cylindrical form. The inlet pipe 25 for the gas passes vertically through the center of the cup 21 and extension 23 and into the float 22, being provided at its upper terminal with a deflector 26 arranged to cause effective distribution of gas within the float 22 and an even and continual flow of gas therethrough.

The inlet pipe 25 is extended externally of the casing constituted by the walls 13 and is connected with a needle valve 27 and a manometer and scale for flow indicator.

As will be understood, the shape of the float 22 and arrangement of the baffle or deflector 26 causes an effective purging and an even distribution of the incoming gas throughout the entire internal area of the float so as to insure accuracy of the instrument in the test of gas throughout all periods of its continuous operation.

The upper cup 20 is provided centrally with a hollow upstanding portion 30 providing a well 31 for the sealing liquid and is closed at its upper terminal by a removable cover 32 which may be conveniently removed to afford access to the cup for the purpose of removing or replenishing the supply of sealing liquid. The upper terminal of the float 22 is also of conical form and communicates with an upstanding tubular outlet 33 which passes upwardly through the member 30 and is provided with a depending flange 34 which is submerged in the liquid in the well 31, and thus coacts with the fluid in the lower cup 21 to hermetically seal the float 22 against communication with the atmosphere.

The cup 20 communicates with an outlet pipe 35 by which the gas is conducted from the float 22.

The balance bar 16 is provided with a rigid yoke-shaped member 36 having knife edges 37 at the terminals on which are engaged the hooks 38 carried by the float supporting links 39. By means of the hooks 38 engaging the knife edges 37 the float 22 is suspended from the balance bar 16 and is capable of moving vertically with the latter in the sealing liquid contained in the cups 20 and 21.

The balance bar 16 is connected with a balance arm 40 on which is adjustably mounted a balance weight 41, the latter being preferably threaded on the arm 40 for convenience in effecting its adjustment and being held in adjusted position by means of a lock nut 42. For convenience in making small adjustments a vernier weight 43 is located on the arm 40, and the movement of the latter is confined in a suitable bracket 44 attached to the frame structure 10.

Laterally of the compartment constituted by the walls 13 for receiving the balance mechanism a casing 45 having a movable door 46 is located and receives the recording mechanism which is constituted by a clockwork mechanism 47 carrying a support 48 having removable chart 49, the latter being secured in position by a nut or equivalent means 50. The chart 49 is divided into sections by radial lines for divisions of time according to the type of clockwork mechanism 47 employed, and the record of the density of gas passing through the float 22 is made by a marker 51 mounted on a lower terminal of a marker arm 52 which is attached at 53 to a terminal of the balance bar 16 which is extended through one of the walls 13 and into the casing 45.

A rod 54 is fixed to the terminal 53 of the balance bar and carries an adjustable calibrating weight 55.

The compensating mechanism for atmospheric changes in thermal and barometric conditions is designed to correct changes in the buoyancy of the float due to atmospheric changes. This mechanism includes a mercury container 60 which is elongated in the horizontal direction and is mounted for adjustment in a plane transverse to the axis of the balance bar 16 in a bracket 61 having slots 62 therein, in which the supporting bolts 63 for the container 60 are mounted. The open terminal of the container 60 is connected by a flexible tube 64 with a U-shaped tube 65, the vertical leg 66 of which is located beside a mercury gauge and scale 67 suitably supported on a side wall 13 of the instrument. The U-tube is connected by a pipe 68 with a compensator tank 69 in which there is provided a compensating valve 70.

The top of the float 22 is provided with a pin 71 for supporting small weights employed for testing the gravitometer, the weights being conveniently stored in the casing 45 of the recording mechanism.

In setting up the machine for use the proper quantity of sealing liquid is introduced in the cups 20 and 21, the top cup 20 being conveniently filled by removing the removable cover 32, and the lower cup being filled with the aid of a tube 72 passed downwardly through the extensions 33 and 23 and into the cup 21. In case the float should bind in either of the cups and not move freely in a vertical plane, the position of the cups may be readily adjusted at this time by loosening the screw 73 and readjusting the position of the cups until such freedom of movement is attained. Mercury is then poured into the container 60 until the level of the mercury in the gauge tube 66 registers with the zero point on the scale 67. The clockwork mechanism 47 is then wound, and then for testing the gravitometer five small weights are placed upon the pin 71 and the weight 41 on the balance arm 40 is adjusted until the marker 51 rests on the 1.0 line of the chart 48. The mercury container 60 should be in such condition that with the marker resting on the 1.0 line an increase or decrease in the amount of mercury in said container will not alter the position of the marker on the chart 48, and this may be readily ascertained by pumping air from the valve 70 into the tank 69 sufficiently to increase the mercury gauge reading on the scale 67 to .15. If the marker 51 is not affected, the setting of the mercury container is correct, but if the marker is moved the container 60 must be adjusted in the bracket 61 until the desired results are obtained. Then with the marker 51 on the 1.0 point on the chart 48 and the compensator scale 67 reading zero the calibration of the instrument is tested by removing the five small weights on the pin 71. The removal of these weights should bring the marker 51 to the 0.5 line of the chart 48, and if the marker does not rest at this point with the five weights removed the calibrating weight 55 is adjusted until the marker rests on the 0.5 line of the chart. The five small weights are successively replaced on the pin and in each replacement the marker should read on the chart 48 0.5, 0.6, 0.7, 0.8, 0.9 and 1.0.

The atmospheric conditions are then observed in the vicinity of the instrument both as regards temperature and barometric pressure, and by reference to a chart 75 located in clear view within the casing of the instrument, the pressure reading for the scale 67 corresponding to the observed temperature and barometric pressure conditions of the atmosphere is noted; the chart 75 being supplied with the instrument for facilitating adjustment for varying atmospheric conditions. Having ascertained the reading on the chart 75 the pressure in the tank 69 is either increased or decreased according to the reading of the chart 75, and subsequent variations in the temperature or barometric pressure will cause corresponding variations in the pressure in the tank 69 which will in turn cause the amount of mercury in the container 60 to change thereby accurately compensating for the effect of changed atmospheric conditions on the gravitometer.

The gas is admitted to the float 22 by the pipe 25, and the float being suspended in the two liquid seals insures against loss of its contents. The gas passes out of the float through the outlet pipe 35, and the gas is thus maintained in circulation during the recording of its gravity. There is a certain buoyant force exerted by the air on the float which is counter-balanced by a force exerted by the calibrating weight, so that the float and balance bar are in a state of equilibrium. When the gravity of the gas passing through the float changes the forces acting on the float are thrown out of equilibrium and the float and balance bar move to such a position that the counter-balancing force exerted by the calibrating weight is again equal to the buoyant force of air on the float and a condition of equilibrium is again established. As the pen arm is an integral part of the balance bar it also moves to such a position that the pen records the new gravity of the gas in the float.

From the foregoing it is believed that the construction, operation and advantages of the invention may be readily understood, and that it is manifest that changes may be made in the details disclosed without departing from the spirit and scope of the invention.

What I claim is:

1. In combination, a balance mechanism including a counter-balanced balance bar and a float suspended from said bar, and inlet and outlet pipes connected by gas-tight joints with the float permitting the continual passage of gas therethrough.

2. In combination, a balance mechanism including a counter-balanced balance bar and a float suspended from said bar, and inlet and outlet pipes connected by gas-tight joints with the float permitting the continual passage of gas therethrough, and valve control means associated with certain of said pipes.

3. In combination, a balance mechanism including a counter-balanced balance bar and a float suspended from said bar, and inlet and outlet pipes connected by gas-tight joints with the float permitting the continual passage of gas therethrough, and a recording mechanism associated with the balance mechanism for continually recording the gravity of gas passing through the float.

4. In combination, a balance mechanism including a counter-balanced balance bar and a float suspended from said bar, and inlet and outlet pipes connected by gas-tight joints with the float permitting the continual passage of gas therethrough, and valve control means associated with certain of said pipes, and a recording mechanism associated with the balance mechanism for continually recording the gravity of the gas flowing through said float.

5. In combination, a float and means for conducting gas to and from said float without leakage, and means associated with said float for continually recording the gravity of gas passing through said float.

6. In combination, a balance mechanism including a counter-balanced balance bar and a float suspended from said bar, and inlet and outlet pipes connected with the float permitting the continual passage of gas therethrough, said float being mounted for vertical movement, and means sealing said float at the points of connection with the inlet and outlet pipes.

7. In combination, a balance mechanism including a counter-balanced balance bar and a float suspended from said bar, and inlet and outlet pipes connected with the float permitting the continual passage of gas therethrough, said float being vertically movable, and fluid seal means closing the tank at the points of connection of the inlet and outlet pipes.

8. In combination, a balance mechanism including a counter-balanced balance bar and a float suspended from said bar, and inlet and outlet pipes connected with the float permitting the continual passage of gas therethrough, said float being vertically movable, and fluid seal means closing the tank at the points of connection of the inlet and outlet pipes, said fluid seal means including containers for a liquid sealing medium and extensions on the float, the pipes extending into the liquid sealing medium.

9. In combination, a balance mechanism including a float mounted for vertical movement, and means for conducting gas to and from said float, counter-balancing means associated with the float and means associated with said float for compensating for temperature changes.

10. In combination, a balance mechanism including a float mounted for vertical movement, and means for conducting gas to and from said float, a counter-balancing means associated with the float and means associated with said float for compensating for changes in barometric pressure.

11. In combination, a balance mechanism including a float mounted for vertical movement, and means for conducting gas to and from said float, counter-balancing means associated with the float and means associated with said float for compensating for temperature changes and changes in barometric pressure.

12. In combination, a balance mechanism including a float mounted for vertical movement, and means for conducting gas to and from said float, counter-balancing means associated with the float and means associated with said float for compensating for temperature changes and changes in barometric pressure, and a recording mechanism associated with the float for continually recording the gravity of gas passing therethrough.

13. In combination, a vertically movable float, and means for conducting gas to and from said float, counter-balancing means associated with said float, and means for compensating for the effect of changing atmospheric conditions on the contents of the float.

14. In combination, a vertically movable float, and means for conducting gas to and from said float, counter-balancing means associated with said float, and means for compensating for the effect of changing atmospheric conditions on the contents of the float, said means including a body of fluid mounted for movement with the float, and means for automatically varying the level of the fluid body with respect to the float.

15. In combination, a vertically movable float, and means for conducting gas to and from said float, counter-balancing means associated with said float, and means for compensating for the effect of changing atmospheric conditions on the contents of the float, said compensating means including a container mounted to move with the float, a body of liquid in said container, and means for automatically varying the level of the body of liquid in the container in response to changing atmospheric conditions.

16. In combination, a vertically movable float, and means for conducting gas to and from said float, counter-balancing means associated with said float, and means for compensating for the effect of changing atmospheric conditions on the contents of the float, said compensating means including a container mounted to move with the float, a body of liquid in said container, and means for automatically varying the level of the body of liquid in the container in response to changing atmospheric conditions, said last mentioned means including a body of fluid of variable pressure acting upon the first mentioned fluid body.

17. In combination, a vertically movable float, and means for conducting gas to and from said float, counter-balancing means associated with said float, and means for compensating for the effect of changing atmospheric conditions on the contents of the float, said compensating means including a container mounted to move with the float, a body of liquid in said container, and means for automatically varying the level of the body of liquid in the container in response to changing atmospheric conditions, said last mentioned means including a body of fluid of variable pressure acting upon the first mentioned fluid body, and means for varying the pressure of the second fluid body independently of the atmospheric conditions.

18. In combination, a vertically movable float, and means for conducting gas to and from said float, counter-balancing means associated with said float, and means for compensating for the effect of changing atmospheric conditions on the contents of the float, said compensating means including a container mounted to move with the float, a body of liquid in said container, and means for automatically varying the level of the body of liquid in the container in response to changing atmospheric conditions, said last mentioned means including a body of fluid of variable pressure acting upon the first mentioned fluid body, and means for indictating the level of the first mentioned body of liquid in the container.

19. In combination, a vertically movable float, and means for conducting gas to and from said float, counter-balancing means associated with said float, and means for compensating for the effect of changing atmospheric conditions on the contents of the float, said compensating means including a container mounted to move with the float, a body of liquid in said container, and means for automatically varying the level of the body of liquid in the container in response to changing atmospheric conditions, said last mentioned means including a body of fluid of variable pressure acting upon the first mentioned fluid body, and means for varying the pressure of the second fluid body independently of the atmospheric conditions, and means for indicating the pressure condition of the second mentioned fluid body.

20. In combination, a balance mechanism including a counter-balanced balance bar and a float suspended from said bar in the atmosphere, and inlet and outlet pipes connected with the float permitting the continual passage of gas therethrough, and calibrating means associated with said bar.

21. In combination, a balance mechanism including a counter-balanced balance bar and a float suspended from said bar in the atmosphere, and inlet and outlet pipes connected with the float permitting the continual passage of gas therethrough, and a recording mechanism associated with said balance bar, and means acting in response to varying atmospheric conditions for compensating for the effect thereof on the gas flowing through the float.

DONALD A. SILLERS.
HOWARD W. PRICE.
JOSEPH W. BARTLETT.